(12) United States Patent
Kinugawa et al.

(10) Patent No.: US 8,245,146 B2
(45) Date of Patent: Aug. 14, 2012

(54) MAP DISPLAY DEVICE AND METHOD FOR CONTROLLING INDICATION OF MAP

(75) Inventors: Takaomi Kinugawa, Chiryu (JP); Yutaka Azuma, Nukata-gun (JP); Toshio Nomura, Nagoya (JP)

(73) Assignee: DENSO CORPORATION, Kariya (JP)

( * ) Notice: Subject to any disclaimer, the term of this patent is extended or adjusted under 35 U.S.C. 154(b) by 279 days.

(21) Appl. No.: 12/659,636

(22) Filed: Mar. 16, 2010

(65) Prior Publication Data

US 2010/0241975 A1 Sep. 23, 2010

(30) Foreign Application Priority Data

Mar. 19, 2009 (JP) .................................. 2009-67533

(51) Int. Cl.
*G06F 3/048* (2006.01)
*G08G 1/123* (2006.01)
*G01C 21/00* (2006.01)
(52) U.S. Cl. ......... 715/764; 701/445; 701/450; 701/532
(58) Field of Classification Search .................. 715/764, 715/790; 701/208–211, 445, 450, 532
See application file for complete search history.

(56) References Cited

U.S. PATENT DOCUMENTS

| | | | |
|---|---|---|---|
| 6,565,610 B1 * | 5/2003 | Wang et al. | .................. 715/210 |
| 7,650,237 B2 | 1/2010 | Aoto | |
| 7,739,037 B2 | 6/2010 | Sumizawa et al. | |
| 2006/0074547 A1 * | 4/2006 | Kaufman et al. | ............. 701/211 |
| 2009/0153563 A1 * | 6/2009 | Tudose | ......................... 345/467 |

FOREIGN PATENT DOCUMENTS

| | | |
|---|---|---|
| JP | A-07-244719 | 9/1995 |
| JP | A-08-63575 | 3/1996 |
| JP | A-09-230785 | 9/1997 |
| JP | A-2002-131068 | 5/2002 |
| JP | A-2006-145332 | 6/2006 |
| JP | A-2006-276139 | 10/2006 |
| JP | A-2007-64631 | 3/2007 |
| JP | A-2007-71812 | 3/2007 |

* cited by examiner

*Primary Examiner* — Weilun Lo
*Assistant Examiner* — Dino Kujundzic
(74) *Attorney, Agent, or Firm* — Posz Law Group, PLC

(57) ABSTRACT

A storage medium stores map data divided into unit areas. A control circuit indicates a map on an image display unit according to the map data. The map data includes name records, which respectively correspond to names to be indicated in the map. Each of the name records includes information specifying a character string of corresponding one of the names and information specifying an indication range of the character string in the map. An updating unit updates a part of the unit areas of the map data. An extracting unit extracts a pair of the same character strings, which are overlapped and indicated in the map or closely indicated in the map, with reference to the name records, after update of the part of the unit areas of the map data. A prohibiting unit prohibits indication of one of the extracted pair in the map.

6 Claims, 6 Drawing Sheets

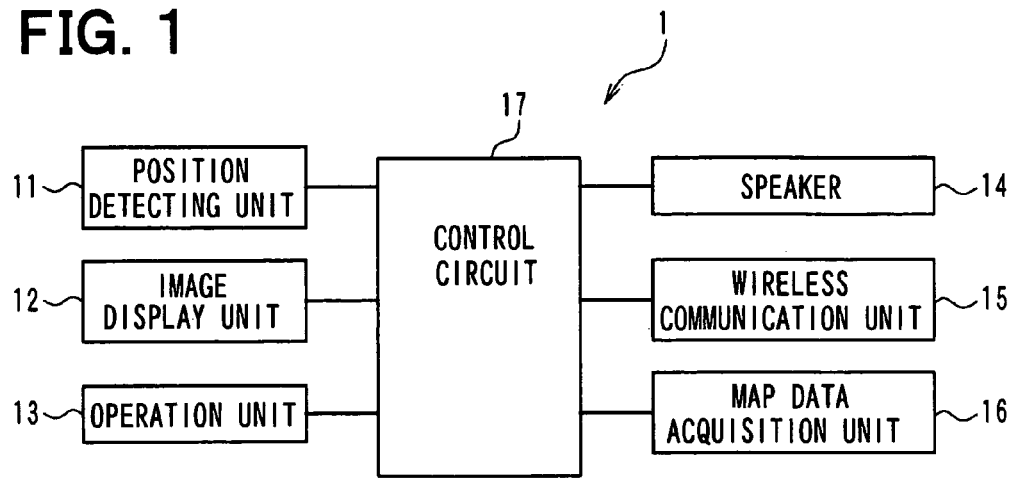

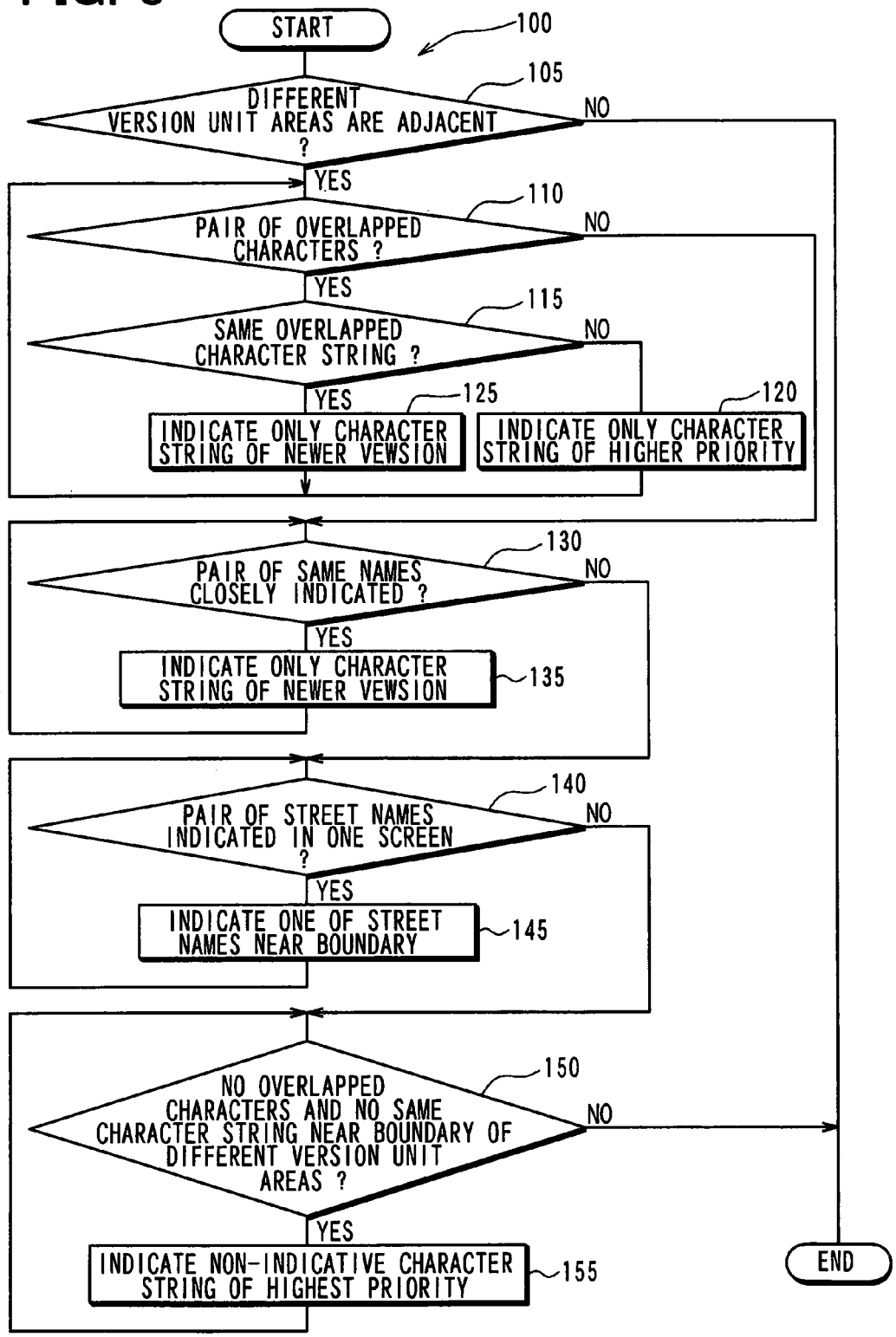

MAP DISPLAY DEVICE AND METHOD FOR CONTROLLING INDICATION OF MAP

CROSS REFERENCE TO RELATED APPLICATIONS

This application is based on and incorporates herein by reference Japanese Patent Application No. 2009-67533 filed on Mar. 19, 2009.

FIELD OF THE INVENTION

The present invention relates to a map display device. The present invention further relates a method for controlling indication of a map.

BACKGROUND OF THE INVENTION

For example, JP-A-2002-131068 discloses a map display device configured to indicate a character string of only one of two names higher in the priority and configured to prohibit indication of a character string of the other of the two names lower in the priority when the character strings of the two names overlaps one another in the map. Further, the map display device is configured to re-indicate the character string, which is prohibited from indication, when the character string, which is prohibited from indication, is not overlapped any longer. In the JP-A-2002-131068, the two names having the character strings overlaps one another are names of different two features. It is noted that, according to an inventor's study, indication of two character strings of names of, for example, the same features may occur from now on. The reason is that, as a new method for updating of map data, an area update operation may be in practice to update only a part of a geographic range in map data. When such an area update operation is performed, redundant indication of the same character strings may occur, as shown below.

FIGS. 4A, 4B show a first example of redundant characters. In the example of FIG. 4A, in the map data before being updated, a feature 24 exists in an area 21 close to a boundary 23 between the area 21 and an area 22, and a character string 25 of a company name of "SUNDAY" is indicated close to the company 24. In the present condition, it is assumed that the area 22 is updated without updating of the area 21 by the area update operation. By the present area update operation, while map data of the area 22 is updated to a new version of the map data, the previous version of the map data of the area 21 remains. In the present condition, it is assumed that position information on the feature 24 was inaccurate or wrong in the previous version of map, and therefore, the position information on the feature 24 is corrected to accurate information in the new version. Consequently, it is assumed that even though the feature 24 belonged to the area 21 in the previous version of the map data, the same feature 24' becomes to belong to the area 22 in the new version of the map data. In this case, when the area 22 is updated, and when the area 21 is not updated, the same two features 24 and 24 may exist closely to each other near the area boundary 23 in the map data. As shown in FIG. 4B, when a map indicating operation is performed according to the map data, the name character strings 25 and 25' of the same name of "SUNDAY" may overlap one another and may be indicated. Alternatively, as shown in FIG. 4C, the name character strings 25 and 25' of the same name of "SUNDAY" may be closely indicated, even thOugh not being overlapped one another.

Further, FIGS. 5A, 5B show a second example of the redundant characters. In the example of FIG. 5A, similarly to the example of FIG. 4A, before updating of the map, one street (specifically, National Route Meishi, National Route 23) 26 extends through both areas 21 and 22 over the boundary 23 between the area 21 and the area 22. In this case, it is conceived that a link sequence record, which includes a link group 26a of the street 26 in the area 21, is stored as a link sequence record belonging to the area 21, and a link sequence record, which includes a link group 26b of the street 26 in the area 22, is stored as a link sequence record belonging to the area 22. In this case, since the link group 26a and the link group 26b are originally a part of the same street 26, the street name corresponding to the link sequence record of the link group 26a is the same as the street name corresponding to the link sequence record of the link group 26b. Therefore, two street names corresponding to the two link sequence records specifying the same street are indicated. Consequently, as shown in FIG. 5A, the same multiple street names 27 and 27' may be indicated on one display screen. Thus, the appearance of the map may be impaired and complicated.

In view of the present problem, when a map data manufacturer creates the same version of map data over multiple areas using a computer, it is conceived to beforehand configure map data not to redundantly indicate multiple names of one street in one screen of an image display unit. For example, as shown in FIG. 5A, the map data may be configured to indicate only the name 27 among the same street names 27 and 27' and not to indicate the name 27'. However, as a result of the area update operation, when the area 22 is updated and when the area 21 is not updated, configuration of indication/non-indication of the names may not be appropriately performed in different versions of map data. Therefore, as shown in FIG. 5B, as a result of the area update operation, the same street names 27 and 27' are indicated in the adjacent areas. Consequently, the same names of the one street overlapped one another may be indicated on one screen of an image display unit.

SUMMARY OF THE INVENTION

In view of the foregoing and other problems, it is the first object of the present invention to beforehand avoid indication of character strings of the same name overlapped one another due to the area update operation and indication of character strings of the same name close to each other due to the area update operation. It is the second object of the present invention to beforehand avoid redundant indication of the same street names in one screen due to the area update operation. It is another object of the present invention to produce a method for controlling indication of a map.

According to one aspect of the present invention, a map display device comprises an image display unit. The map display device further comprises a storage medium configured to store map data divided into unit areas including a first unit area and a second unit area. The map display device further comprises a control circuit configured to indicate a map on the image display unit according to the map data. The map data includes name records respectively corresponding to names to be indicated in the map. Each of the name records includes information specifying a character string of corresponding one of the names and information specifying an indication range of the character string in the map. The control unit includes an updating unit configured to update the second unit area. The control unit further includes an extracting unit configured to extract a pair of same character strings, which are overlapped and to be indicated in the map, with reference to the name records, after update by the updating unit. The control unit further includes a prohibiting unit configured to prohibit indication of one of the pair, which is extracted by the extracting unit, in the map.

According to another aspect of the present invention, a map display device comprises an image display unit. The map display device further comprises a storage medium configured to store map data divided into unit areas. The map display device further comprises a control circuit configured to indicate a map on the image display unit according to the map data. The map data includes name records respectively corresponding, to names to be indicated in the map, and Each of the name records includes information specifying a character string of corresponding one of the names and information specifying an indication range of the character string in the map. The control unit includes an updating unit configured to update a part of the unit areas. The control unit further includes an extracting unit configured to extract a pair of same character strings, which are to be closely indicated in the map, with reference to the name records, after update by the updating unit. The control unit further includes a prohibiting unit configured to prohibit indication of one of the pair, which is extracted by the extracting unit, in the map.

According to another aspect of the present invention, a map display device comprises an image display unit. The map display device further comprises a storage medium configured to store map data divided into unit areas. The map display device further comprises a control circuit configured to indicate a map on the image display unit according to the map data. The map data includes street name records respectively corresponding to street names to be indicated in the map. Each of the street name records includes information specifying a character string of corresponding one of the street names and information specifying an indication range of the character string in the map. The control unit includes an updating unit configured to update a part of the unit areas. The control unit further includes an extracting unit configured to extract a pair of character strings of same street names, which are to be indicated in an indication range of the map within one screen of the image display unit, with reference to the street name records after update of the updating unit. The control unit further includes a prohibiting unit configured to prohibit indication of one of the pair, which is extracted by the extracting unit, in the map.

According to another aspect of the present invention, a method for controlling indication of a map, the method comprises storing map data divided into unit areas including a first unit area and a second unit area, wherein the map data includes name records respectively corresponding to names to be indicated in the map, and each of the name records includes information specifying a character string of corresponding one of the names and information specifying an indication range of the character string in the map. The method further comprises updating the second unit area. The method further comprises extracting a pair of same character strings, which are overlapped and to be indicated in the map, with reference to the name records, after update by the updating unit. The method further comprises prohibiting indication of one of the pair, which is extracted by the extracting unit, in the map. The method further comprises indicating a map and an other of the pair, which is extracted by the extracting unit, on the image display unit according to the map data, excluding the prohibited one of the pair.

According to another aspect of the present invention, a method for controlling indication of a map, the method comprises storing map data divided into unit areas, wherein the map data includes name records respectively corresponding to names to be indicated in the map, and each of the name records includes information specifying a character string of corresponding one of the names and information specifying an indication range of the character string in the map. The method further comprises updating a part of the unit areas. The method further comprises extracting a pair of same character strings, which are to be closely indicated in the map, with reference to the name records, after update by the updating unit. The method further comprises prohibiting indication of one of the pair, which is extracted by the extracting unit, in the map. The method further comprises indicating a map and an other of the pair, which is extracted by the extracting unit, on the image display unit according to the map data, excluding the prohibited one of the pair.

According to another aspect of the present invention, a method for controlling indication of a map, the method comprises storing map data divided into unit areas, wherein the map data includes street name records respectively corresponding to street names to be indicated in the map, and each of the street name records includes information specifying a character string of corresponding one of the street names and information specifying an indication range of the character string in the map. The method further comprises updating a part of the unit areas. The method further comprises extracting a pair of character strings of same street names, which are to be indicated in an indication range of the map within one screen of the image display unit, with reference to the street name records after update of the updating unit. The method further comprises prohibiting indication of one of the pair, which is extracted by the extracting unit, in the map. The method further comprises indicating a map and an other of the pair, which is extracted by the extracting unit, on the image display unit according to the map data, excluding the prohibited one of the pair.

BRIEF DESCRIPTION OF THE DRAWINGS

The above and other objects, features and advantages of the present invention will become more apparent from the following detailed description made with reference to the accompanying drawings. In the drawings:

FIG. 1 is a block diagram showing a structure of an in-vehicle navigation device 1 related to an embodiment;

FIG. 2 is a table showing a structure of a link sequence record;

FIG. 3 is a table showing a structure of a name record;

FIG. 6 is a flow chart of a program 100 executed by a control circuit;

DETAILED DESCRIPTION OF PREFERRED EMBODIMENTS

Figure 4A:
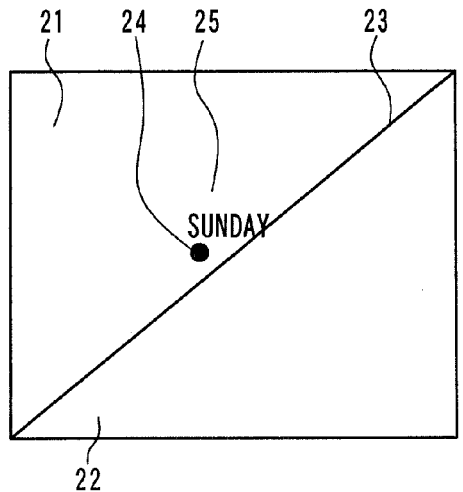
FIGS. 4A to 4C are views showing one example of the same characters overlapped one another caused by a map updating operation.

As follows, the first embodiment will be described. As show in FIG. 1, according to the present embodiment, an in-vehicle navigation device 1 mounted in a vehicle includes a position detecting unit 11, an image display unit 12, an operation unit 13, a speaker 14, a wireless communication unit 15, a map data acquisition unit 16, and a control circuit 17. The in-vehicle navigation device 1 is one example of a map updating device.

The position detecting unit 11 includes various generally-known sensors such as an acceleration sensor, a geomagnetism sensor, a gyroscope sensor, a vehicle speed sensor, and a GPS receiver. The position detecting unit 11 generates information for identifying a current position of a vehicle, a direction of a vehicle, and speed of a vehicle based on the various sensors and outputs the information to the control unit 17.

The image display unit 12 displays an image based on an image signal outputted from the control circuit 17 to a user. The displayed image is, for example, a map having a center on the current position of the vehicle.

The operation unit 13 has an input device such as a mechanical switch and/or a touch panel and outputs a signal to the control circuit 17 according to a user's operation of the input device.

The wireless communication unit 15 is a generally-known wireless device for communicating with a map distribution server outside the vehicle. The control circuit 17 can receive the map data from the map distribution server through the wireless communication unit 15 via a wireless transmission.

The map data acquisition unit 16 includes a storage device such as a hard disk drive and a flash memory device having a nonvolatile storage medium and a device for reading data from the storage medium and writing data in the storage medium. The storage medium stores a program, which the control circuit 17 executes, and map data for a map indication function and a route guidance function.

The map data is divided into multiple segments for each indication scale so that the map can be indicated in multiple indication scales. As follows, a data structure of the map data applicable to multiple indication scales will be described. In the present embodiment, the indication scale is defined as a reduction ratio calculated by dividing an actual distance by a distance on the map. Therefore, a geographic range, which can be displayed on one screen, becomes small, as the indication scale becomes large.

The map data in each scale contains road data, feature data, and name data. The road data contains link sequence data. The link sequence data is for organizing and managing links, which constitutes one road (passage) such as a street, a national highway, and a highway.

The link sequence data contains multiple link sequence records. Each link sequence record corresponds to one street constituted by the link sequence. The one street is, for example, the National Route 1 (Japanese national highway No. 1), the National Route 23 (National Route Meishi), and the like. The link sequence includes multiple links, which are continuously connected.

As shown in FIG. 2, a link sequence record of one street contains a link sequence ID, a link ID of a start point of the link sequence, which constitutes the one street, a link ID of an end point of the link sequence which constitutes the one street, and node data, as attribute information on the certain street. The link sequence data is classified into each indication class and stored. The indication class specifies an indication scale by which the link sequence data is used. The link ID is assigned to each of the links, which constitute one street, in an ascending order from the start point link to the end point link. Therefore, link IDs of all links, which constitute the street, can be specified according to the link ID of the start point link and the link ID of the end point link among the links, which constitute the one street.

The node data contains multiple node records. Each node record corresponds to each node belonging to the street. A node record corresponding to a certain node contains connection information on a link connected to the node, a link ID of a link connected to the node, an offset to a name record, which includes a street name of a street, to which the node belongs, an offset to a name record, which includes a node name (intersection name) of the node, classification information on a link, and the like. The classification information indicates, for example, a kind of a passage such as a highway, a local street, and the like.

In the present structure of the link sequence record, the street name of a certain street can be obtained by reading the node data in the link sequence record corresponding to the certain street and referring to a destination of the offset to the name record in the read node data.

The feature data contains multiple feature records. Each of the multiple feature records corresponds one of multiple features including, for example, a facility, such as a park and a store, and a natural object. A feature record of a certain feature contains, as attribute information on the feature, an offset to a name record, which stores a feature name of the feature such as a company name, indication scale information, location information on the feature such as a latitude and a longitude, classification information on the feature, and the like. The indication scale information is data specifying an indication scale in which the feature record is indicated.

The name data includes information on an indicated item displayed on a map. The indicated item is, for example, a name of a feature, a name of a street, a name of an intersection, a name of an administrative district, a name of a place, a name of a natural feature, and the like. The name data contains multiple name records. Each name record corresponds to one name used as an object (map-indicated object) indicated on the map.

As shown in FIG. 3, a name record corresponding to a certain map-indicated object contains, as attribute information on the map-indicated object in an indication scale, indication scale information, reference position coordinates, an arrangement type, a name indication class, a detailed priority, a name-character number, a name character string, an indication/non-indication flag, and the like. The indication scale information is data specifying an indication scale in which the name record is indicated.

The reference position coordinates specify a latitude and a longitude of a position used as a reference when the name of the map-indicated object is indicated on the map. The reference position coordinates may be constant for the same map-indicated object regardless of an indication scale and may be differently set according to the indication scale.

The arrangement type is information, which specifies an arrangement type of the name indicated as the map-indicated object. The arrangement type includes, for example, (1) arrangement of characters in a horizontal writing within a rectangle centering on the reference position coordinates, (2) arrangement of characters in a vertical writing within a rectangle centering on the reference position coordinates, (3) arrangement of characters in a horizontal writing within a rectangle, which has a start point moved from the reference position coordinates by an offset degree in the latitude direction and an offset degree in the longitude degree. The arrangement type may be constant for the same map-indicated object regardless of an indication scale and may be differently set according to the indication scale.

When the indication scale information, the reference position coordinates, the number of name characters, and the arrangement type are determined, an indication range in the map on the image display unit 12, in which character strings of the name corresponding to the name record is indicated, is determined according to a character size (number of dots) of each of the indicated characters. Therefore, the indication scale information, the reference position coordinates, the number of name characters, and the arrangement type information of a certain name character string specify an indication range of the name character string in the map.

The name indication class is information for roughly classifying a priority of indication of a name used as the map-indicated object at, for example, 16 steps. The detailed priority is information for classifying the priority of indication of a name used as the map-indicated object at, for example, 63 steps further in detail. The name-character number is information on a number of characters of a name as the map-indicated object. The name character string is information specifying a character string of the name as the map-indicated object. Regardless of the indication scale, the name indication class, the detailed priority, the name-character number, and the name character string are constant for the same map-indicated object.

The indication/non-indication flag specifies whether the name is indicated as an indicated object. When the indication/non-indication flag is set JON), the name is indicated as an indicated object. Alternatively, when the indication/non-indication flag is reset (OFF), indication of the name as an indicated object is prohibited. The indication/non-indication flag may be constantly c for the same indicated object regardless of an indication scale and may be differently the name record is shown according to the indication scale.

In present embodiment, only a part of the map data is updated to a new version of the map data. More specifically, the feature data of a feature belonging to a part of a geographic range of the map data and the road data of a road belonging to the part of the geographic range are updated. For example, the feature data of a feature belonging to only one country, one state, and/or one prefecture and the road data of a road belonging to the only one country, the one state, and/or the one prefecture are updated. Such an updating method for updating data of a part of a geographic range in the map data is called as an area update operation.

In order to perform the area update operation, in the present embodiment, the map data is further divided to (classified for) unit areas in each indication scale. The unit area is a geographic range as a unit in the area, update operation. Therefore, the link data, the feature data, and the name data do not straddle a boundary of the unit areas, such as a border between nations, a border between states, or a border between prefectures. Thus, link data, the feature data, and the name data belong only to one of the unit areas.

Therefore, a road section, which connects an intersection a in a certain unit area with an intersection b in an adjacent unit area includes two links. That is, one link connects an intersection a of the road section with an area boundary between the certain unit area and the adjacent unit area, and the other link connects the area boundary with the intersection b of the road section.

A street, which extends through multiple unit areas, is divided into link sequence records each associated to each of the multiple unit areas and stored. That is, a street, which extends through multiple unit areas, has multiple link sequence records, and the multiple link sequence records respectively corresponds to multiple unit areas, through which the street extends, one by one. The multiple link sequence records include a link ID of a link, which includes a start point of a link group of the street in a corresponding unit area, and a link ID of a link, which includes an end point of the link group of the street in the corresponding unit area.

Each of an offset to a name record of the node name, an offset to a name record of the street name, and an offset to a name record of the feature name is an offset to a name record belonging to the same unit area. Therefore, a name of a node belonging to a certain unit area, a name of a street belonging to the certain unit area, and a name of a feature belonging to the certain unit area are associated with a name record belonging to the same unit area.

In the present structure of the map data, an indication scale of road data and feature data can be clearly distinguished, and a unit area, to which road data and feature data belong, can be also clearly distinguished.

A control circuit (computer, control unit) 17 is, for example, a microcomputer including a CPU, a RAM, a ROM, an I/O device, and the like. The CPU reads a program from the ROM or the map data acquisition unit 16 and executes the program for an operation of the in-vehicle navigation device 1. In execution of the program, the CPU reads information from the RAM, the ROM, and the map data acquisition unit 16. Further, the CPU writes information in the RAM and a storage medium of the map data acquisition unit 16. Further, the CPU exchanges signals with the position detecting unit 11, the image display unit 12, the operation unit 13, the speaker 14, and the wireless communication unit 15.

Specifically, the control circuit 17 executes a program to perform a current position specifying operation, a map indicating operation, a guidance route calculating operation, a route guidance operation, a map update operation, a redundant characters avoidance operation, and the like. The current position specifying operation is performed for specifying the current position and a direction of the vehicle by using, for example, generally-known map matching, based on a signal from the position detecting unit 11.

The map indicating operation is performed for indicating a map of a specific region, such as a peripheral area of the current position of the vehicle, on the image display unit 12. Information used for this map indicating operation is obtained from the map data.

Specifically, in the map indicating operation, the control circuit 17 specifies, a present indication scale. Further, the control circuit 17 creates a map image indicated on the image display unit 12 using the road data, the link sequence data, the feature data, and the name data, each corresponding to the specified indication scale. Further, the control circuit 17 outputs the created map image to the image display unit 12. A number of dots of the presently created map image in the vertical and horizontal directions is predetermined such that the presently created map image is within the display screen of the image display unit 12.

More specifically, the control circuit 17 determines a range of the latitude and the longitude of the indicated object based on the latitude and the longitude of a point, which corresponds to the center of the indicated map, the present indication scale, a number of dots of the map image in the vertical and horizontal directions. The control circuit 17 further reads a node record, a link sequence record, and a feature record, which respectively correspond to a node, a link sequence, and a feature, which are in the range of the indicated object. The control circuit 17 further converts the position (latitude, longitude) specified by the read node record, the read link record, or the read feature record into a dot position in the map image based on the latitude and the longitude of the center point of the indicated image, the present indication scale, and the number of dots of the map image in the vertical and the horizontal directions. The control circuit 17 further draws an image in a shape of the node, the link, or the feature at the converted position in the map image.

The control circuit 17 further extracts an offset to a name record of an intersection, an offset to a name record of a feature, or an offset to a name record of a street, which are specified by the read node record and the read feature record. The control circuit 17 further reads a name record corresponding to the present indication scale and stored in the record specified by the extracted offset. The control circuit 17 further draws a name character string of each of the read name record on the map image.

It is noted that the control circuit 17 draws a name character string on the map image only when the indication/non-indication flag of the name record is set. That is, the control circuit 17 does not draw the name character string on the map image when the indication/non-indication flag of the name record is reset.

The control circuit 17 determines a position of the name character string indicated on the map image based on a reference position coordinates of the name record, an arrangement type of the name record; and a size of the indicated character of the name record. Specifically, the control circuit 17 determines a position equivalent to the reference position coordinates in the map image based on the latitude and the longitude of the center point of the indicated image, the present indication scale, and the number of dots of the dot matrix of the map image in the vertical and the horizontal directions. The control circuit 17 further draws the character in the specified arrangement type and the size based on the determined position.

The size of the indicated character is predetermined and stored the storage medium of the map data acquisition unit 16. The predetermined character size may be a fixed value and may be a variable changed according to an operation of the operation unit 13 by a user.

The control circuit 17 functions as a map display control unit when performing the map indicating operation.

The guidance route calculating operation is performed to calculate an optimal guidance route from the current position to the destination, which is inputted by a user via the operation unit 13. The route guidance operation is performed for outputting a guidance voice to instruct a right turn operation, a left turn operation, and the like via the speaker 14 and indicating an enlarged image of a guidance point on the image display unit 12 when the self-vehicle comes close to the guidance point such as a right-left-turn intersection on the guidance route so as to guide a driving operation of the vehicle along the guidance route. When the vehicle runs along the guide route, the turning operation and/or instruction of the vehicle is determined based on the physical relationship between nodes.

The map update operation is performed for receiving a part of the map data from a map distribution server outside of the vehicle and performing the area update operation based on the received map data. Specifically, the control circuit 17 starts the map update operation when a user operates the operation unit 13 to execute the predetermined map update operation. Thus, the control circuit 17 requests a new version of the map data for updating the map data to the map distribution server via the wireless communication unit 15. At this time, the control circuit 17 may transmit information to the map distribution server to notify the map distribution server of a unit area associated with a currently needed map data. A user may operate the operation unit 13 to determine transmission of the information of the unit area associated with the currently needed map data.

The map distribution server receives the request of the map data transmission and transmits only the map data of a predetermined unit area or only the map data of the unit area requested from the in-vehicle navigation device 1 to the in-vehicle navigation device 1. The number of the unit area of the transmitted map data may be one and may be two or more.

The control circuit 17 receives the map data of the unit area, which is transmitted in this way, via the wireless communication unit 15. The control circuit 17 further replaces the present map data of the unit area with the received map data of the unit area. For example, the control circuit 17 overwrites the received map data of the unit area on a data area, which stores the present map data of the unit area.

The redundant characters avoidance operation is performed for correcting data, which causes redundant characters, in the map data updated by the map update operation so as to avoid redundant characters. In the present embodiment, the control circuit 17 performs the redundant characters avoidance operation immediately after the end of the map update operation.

As follows, the redundant characters will be described. In the present embodiment, the redundant characters are indication of the same names of the same feature, the same names of the same street, and the like overlapped one another or indication of the same names significantly close to each other around a boundary between an updated unit area and an non-updated unit area. The redundant characters are caused due to update of only a unit area of a part of the map by the area update operation.

Figure 4B:
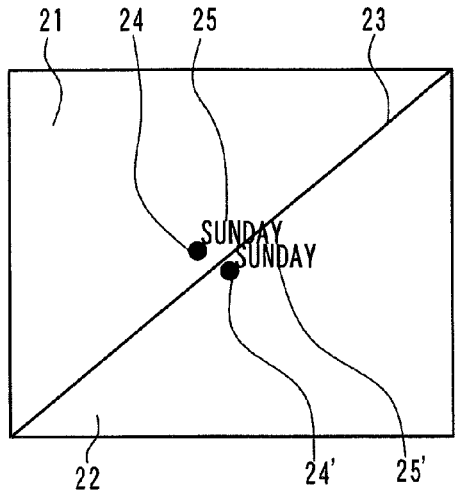
Figure 4C:
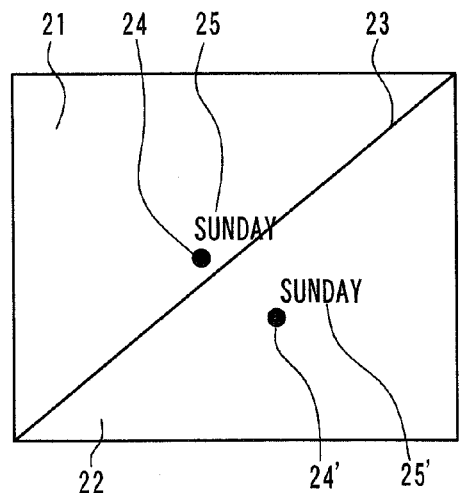

FIGS. 4A to 4C show a first example of the redundant characters. In the example of FIG. 4A, before updating of the map, a feature (company) 24 exists on the side of the unit area 21 close to a boundary 23 between a unit area 21 and a unit area 22. The unit area 21 is one example of a first unit area, and the unit area 22 is one example of a second unit area. The feature data and the name data corresponding to the feature data are indicated. Specifically, the character string 25 of the company name of "SUNDAY" is indicated close to the company 24.

In the present condition, it is assumed that the unit area 22 is updated by the map update operation without updating of the unit area 21. By the map update operation, while the map data of the unit area 22 is updated to the new version of the map data, the previous version of the map data of the unit area 21 remains.

It is noted that, a position of a certain feature stored in a new version map may be different from a position of the feature in a previous version map. In a typical example, position information on a feature was inaccurate or wrong in a previous version of the map, and the position information on the feature is corrected to accurate information in a new version of the map.

Therefore, even though the feature 24 belongs to the unit area 21 in the previous version map data, the same feature 24' may belong to the unit area 22 in the new version map. In this case, when the unit area 22 is updated, and when the unit area 21 is not updated, the same two features 24 and 24' may exist closely to each other near the area boundary 23 in the map data in the map data acquisition unit 16.

As shown in FIG. 4B, when the map indicating operation is performed according to the map data, the name character strings 25 and 25' of the same name of "SUNDAY" may overlap one another and may be indicated. Alternatively, as shown in FIG. 4C, the name character strings 25 and 25' of the same name of "SUNDAY" may, be closely indicated, even though not being overlapped one another. Thus, in one mode of the redundant characters, characters of the same name overlapped one another or characters of the same name close to each other are indicated.

Figure 5A:
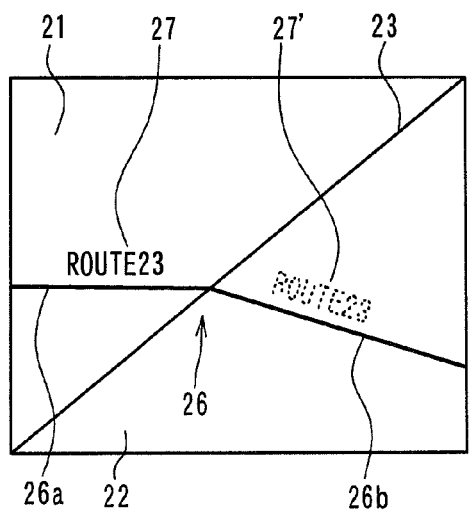
FIGS. 5A and 5B are views showing one example of redundant indication of the same street characters caused by a map updating operation.
Figure 5B:
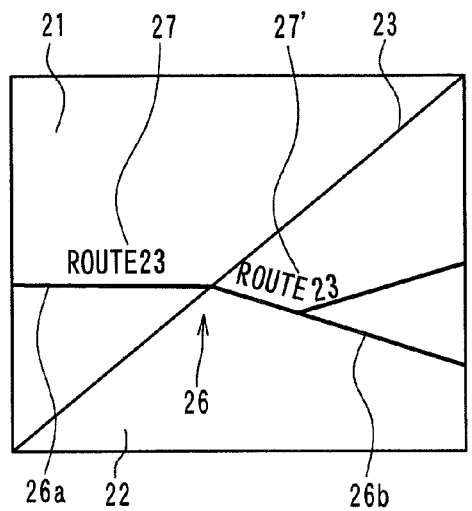

FIGS. 5A, 5B show a second example of the redundant characters. In the example of FIG. 5A, similarly to the example of FIG. 4A, before updating of the map, one street (specifically, National Route 23) 26 extends through both unit areas 21 and 22 over the boundary 23 between the unit area 21 and the unit area 22. In this case, as described above, a link sequence record, which includes the link group 26a of the street 26 on the side of the unit area 21, is stored as a link sequence record belonging to the unit area 21. Further, a link sequence record, which includes the link group 26b of the street 26 on the side of the unit area 22, is stored as a link sequence record belonging to the unit area 22.

The node data contained in each of the link sequence records has the offset to the name record belonging to the same unit area. Therefore, even when link sequence records specify the same street, a name record exists in each of the link sequence records.

The indication/non-indication flag in the name record determines whether a street name corresponding to a certain link sequence record is indicated. Therefore, when all indication/non-indication flags are set in name records corresponding to link sequence records, which include the same street, names of the street are indicated by the number of the link sequence records. In this case, as shown in FIG. 5A, multiple street names 27 and 27' are indicated on the same one display screen. Thus, the appearance of the map is complicated. Thus, indication of characters of the same street name in one screen of the image display unit 12 is another one mode of the redundant characters.

In view of the redundant characters, when a map data manufacturer creates the same version of the map data over multiple unit areas using a computer, the indication/non-indication flag may be set not to redundantly indicate the names of one street in the one screen of the image display unit 12. Specifically, when two name records belonging to unit areas, which correspond to the same street and are adjacent to each other, exists, one of indication/non-indication flags of the two name records may be set, and the other of the indication/non-indication flags may be reset.

In this way, as shown in FIG. 5A, the control circuit 17 performs the map indicating operation to indicate only the name 27 of the same street names 27 and 27' and not to indicate the name 27'.

It is noted that, when the unit area 22 is updated and when the unit area 21 is not updated by the area update operation, the indication/non-indication flags are not necessarily appropriately set and reset between different versions. Therefore, as shown in FIG. 5B, the same street names 27 and 27' may be indicated in the adjacent unit areas after the area update operation. Consequently, names of the one street may be redundantly indicated on the image display unit 12. This is also one mode of the redundant characters.

In order to avoid the redundant characters beforehand, the control circuit 17 performs a redundant characters avoidance operation immediately after the end of the map update operation. Specifically, the control circuit 17 executes a program 100 shown in FIG. 6 once for each scale of the map data.

As follows, the program 100 for one scale of the map data will be described. In the following description, only a portion of the map data in the scale is an object to be referred and rewritten. In the execution of the program 100, at step 105, the control circuit 17 first determines whether unit areas different in the version are adjacent to each other as a result of the area update operation. The version information of each unit area is contained in the map data of the unit area. The determination at the step 105 is made with reference to the version information. When it is determined that the unit areas different in the version are adjacent to each other, the processing proceeds to step 110. Alternatively, when it is determined that the unit areas different in the version are not adjacent to each other, that is, when all the unit areas are in the same version, the processing of the program 100 of the present scale is terminated.

At step 110, a pair of overlapped characters is searched in the vicinity of a boundary between two adjacent unit areas different in the version. When at least one pair of the overlapped characters is found, one pair of the at least one pair of the overlapped characters is selected therefrom, and the processings of step 115 and subsequent steps are performed with respect to the selected one pair.

At step 110, a search range for searching the pair of the redundant characters is limited to the vicinity of the boundary between the two adjacent unit areas different in the version. The limitation is made based on the following premises that the redundant characters are caused by the area update operation, and the redundant characters may scarcely occur in a location away from the vicinity of the boundary between the two adjacent unit areas different in the version. The determination whether the area is close to the boundary is made based on determination whether the area is within a predetermined distance from the boundary, for example. Here, the predetermined distance is counted by dots in the dot matrix of the indicated map image, regardless of the indication scale of the indicated object. The present rule of the predetermined distance is made, since a geographic range, in which redundant characters occur, becomes narrow, as the indication scale becomes large.

Further; at step 110, in order to determine whether redundant characters of names occur in the search range, the control circuit 17 extracts only a certain name record among name records. The extracted certain name record has a name character string having an indication region within the search range according to the reference position coordinates, the arrangement type, and the name-character number and has an indication/non-indication flag, which is set and to be indicated. The character size is predetermined, and the indication scale is determined. The character size, the indication scale, the reference position coordinates, the arrangement type, and the name-character number are determined in each name record. Therefore, the indication area of the name character string is uniquely determined in the dot matrix of the map image. The control circuit 17 can find the pair of the name records (pair of the names), which causes the overlapped characters, by comparing the indication regions of the extracted name records.

At step 115, it is determined whether the selected, pair of the names corresponds to the same character string based on information on the name character strings of the name records corresponding to the names. When the selected pair of the names does not correspond to the same character string, step 120 is subsequently executed. Alternatively, when the selected pair of the names corresponds to the same character string, step 125 is subsequently executed.

At step 120, one of the pair of names, which is lower in the priority, is set to be non-indicative. That is, only the other one, which is higher in the priority, is left as an indicated object name. More specifically, the indication/non-indication flag of the name record, which corresponds to the name lower in the priority, is reset. Thereby, indication of the character string of the name on the map is prohibited.

The determined whether the priority is high or low is made based on the name indication class of the name record corresponding to the name. When the values of the name indication class of the pair of the name records are the same, the priority is determined based on the detailed priority of the name records.

Figure 7A:
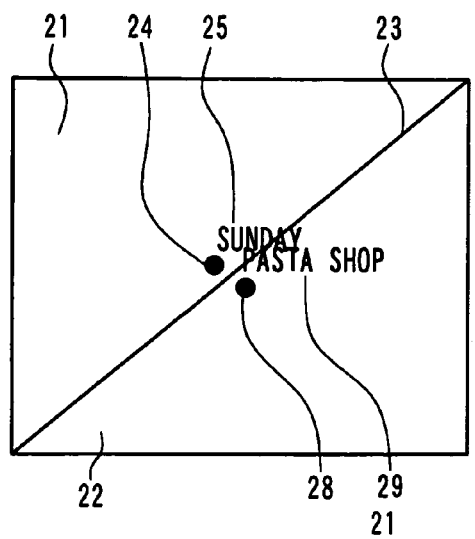
FIGS. 7A, 7B are views showing an operation to avoid overlap of different character strings.
Figure 7B:
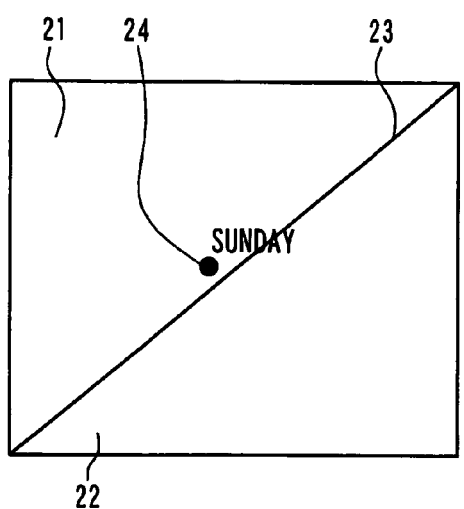

As shown in FIG. 7A, as a result of update of the unit area 22 and non-update of the unit area 21, a name character string (PASTA SHOP) 29 of a newly constructed store 28 and the name character string (SUNDAY) 25 of the company 24, which is initially located in the unit area 21, are overlapped one another and indicated in the unit area 22. By contrast, in the above method, the indication/non-indication flag of the name data, which corresponds to one (for example, store 28) lower in the priority in the two name character strings, is reset. Thus, as shown in FIG. 7B, the overlap of the characters (redundant characters) can be avoided.

At step 125, one of the pair of the same names, which belongs to the unit area newer in the version, is left as an indicated object name. That is, one of the pair of the same names, which belongs to the unit area on the updated side, is left. Namely, the name, which belongs to the unit area older in the version, is set to be non-indicative. That is, the name, which belongs to the unit area on the non-updated side, is set to be non-indicative. More specifically, the indication/non-indication flag of the name record, which corresponds to the name belonging to the unit area older in the version, is reset. Thereby, indication of the character string of the name on the map is prohibited.

As shown in FIG. 4B, as a result of update of the unit area 22 and non-update of the unit area 21, the same name character strings 25 and 25' are overlapped one another and indicated. By contrast, in the above method, the indication/non-indication flag of the name data of the name character strings 25, which belong to the map data older in the version, is reset. Thus, as shown in FIG. 7B, the overlap of the characters (redundant characters) can be avoided. In this way, indication of the character strings of the same names overlapped one another due to the area update operation can be beforehand avoided.

Subsequent to steps 120 and 125, at step 110, it is again determined whether overlapped characters occur in the search range. In this way, one of the pair of the overlapped names (redundant characters) is set to be non-indicative until all the pairs of overlapped names are eliminated. Thereby, all overlapped names (redundant characters) in the vicinity of the area boundary are eventually avoided. When all overlapped names (all overlapped characters) are avoided, step 110 makes a negative determination, and the processing proceeds to step 130.

At step 130, a pair of the same names having character strings close to each other is searched in the vicinity of a boundary between two adjacent unit areas different in the version. That is, a pair of the same name character strings is searched. When at least one pair of the same names close to each other is found, one pair is selected therefrom, and the step 135 is executed with the selected one pair as a processing object.

At step 130, the range, in which a pair of the same names having character strings close to each other is searched, is limited to the vicinity of a boundary between two adjacent unit areas different in the version. The present limitation is made based on the same reason as that of step 110. Further, it is determined whether an indication position of a certain name is close to the boundary by using the same method as that of step 110.

At step 130, a searched object is limited to names close to each other. The present limitation of step 130 is made, since even when two same name character strings exist, the two same name character strings do not necessarily indicate the same features redundantly. That is, two features of the same names respectively corresponding to name character strings may exist not only on the map data but also on an actual area in reality. For example, the same name character string may be given to stores of two franchisees who contract with the same franchiser. In such a case, in order not to accidentally eliminate one character string, the limitation of names close to each other is used. As character strings of two names are close to each other, a possibility that the character strings redundantly indicate the same feature becomes higher.

Determination whether character strings of the same name is close is made by, for example, reading reference position coordinates from each of two name records corresponding to the two same names and determining whether the distance between these two reference position coordinates is less than or equal to a predetermined distance. Here, the predetermined distance is counted according to actual distance, regardless of the indication scale of the indicated object. The present definition is made, since the predetermined distance is a threshold for determining whether the same feature or the like is redundantly indicated, as described above.

Further, at step 130, in order to determine whether overlapped characters of the same names occur in the search range, the control circuit 17 extracts only a certain name record among name records. The certain extracted name record has a name character string having an indication region within the search range according to the reference position coordinates and the arrangement type and has an indication/non-indication flag, which is set and to be indicated. The control circuit 17, as described above, compares the reference position coordinates and the name character strings of the extracted name records, and thereby to find a pair of name records, which are close to each other and have the same name character strings.

At step 135, one of the pair of the same names, which belongs to the unit area newer in the version, is left as an indicated object name. Namely, the name, which belongs to the unit area older in the version, is set to be non-indicative. More specifically, the indication/non-indication flag of the name record, which corresponds to the name character string belonging to the unit area older in the version, is reset. Thereby, indication of the name character string of the name on the map is prohibited.

Figure 9:
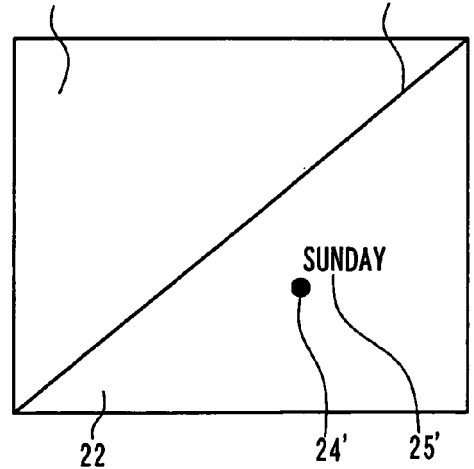
FIG. 9 is a view showing a condition where close indication of the same characters is avoided.

As shown in FIG. 4C, as a result of update of the unit area 22 and non-update of the unit area 21, the same name character strings 25 and 25' of a feature, only one of which actually exists, are closely indicated. By contrast, in the above method, the indication/non-indication flag of the name data of the name character string 25, which belong to the map data older in the version, is reset. Thus, as shown in FIG. 9, the redundant characters (close indication of the same names) can be avoided. In this way, indication of the character strings of the same names closely to each other due to the area update operation can be beforehand avoided.

Subsequent to step 135, at step 130, it is again determined whether a pair of the same names having the character strings close to each other exists in the search range. In this way, one of the pair of the name character strings of the same names, in which the character strings are close to each other, is set to be non-indicative until all pairs of the same names having character strings close to each other are eliminated. Therefore, close arrangement of all the character strings of the same names can be eventually avoided in the vicinity of area boundaries. When close arrangement of all the same name character strings is avoided, step 130 makes a negative determination; and the processing proceeds to step 140.

At step 140, a pair of street names, which may be indicated in one screen, is searched in the vicinity of a boundary between two adjacent unit area different in the version. When at least one pair of the street names, which may be indicated in one screen, is found, one pair is selected therefrom, and the step 145 is executed with the selected one pair as a processing object.

At step 140, the range, in which a pair of the street names to be indicated in one screen, is searched, is limited to the vicinity of a boundary between two adjacent unit areas different in the version. The present limitation is made based on the same reason as that at step 110. Further, it is determined whether an indication position of a certain street name is close to the boundary by using the same method as that of step 110.

More specifically, at step 140, the control circuit 17 extracts only a name record (street name record) of a street name, which is specified by offset in node data contained in a link sequence record, from name records indicated close to the boundary. The control circuit 17 further extracts only a street name record, in which the indication/non-indication flag is set, from the extracted street name records. The control circuit 17 further compares the reference position coordinates and the name character strings of the extracted street name records. Thereby, the control circuit 17 searches a pair of the same street names, two or more of which may be indicated in one screen. When at least one pair of the street names, which may be indicated in one screen, is found, one pair is selected therefrom, and the step 145 is executed with the selected one pair as a processing object.

It is determined whether two street names may be indicated in one screen based on two groups of reference position coordinates in the street name records corresponding to the street names. Specifically, based on the present indication scale, a distance in the horizontal direction between the two groups of reference position coordinates in the dot matrix of the map image and a distance in the vertical direction between the two groups of reference position coordinates in the dot matrix of the map image are specified. Only when the distance in the horizontal direction is less than or equal to a reference horizontal distance and when the distance in the vertical direction is less than or equal to a reference vertical distance in the dot matrix, the two name character strings are determined to be indicated in one screen. That is, in the map, when two name character strings are indicated within a range, which can be indicated in one screen of the image display unit 12, the two name character strings are determined to be indicated in one screen. The reference horizontal distance is the total number of dots in the dot matrix of the screen of the image display unit 12 in the horizontal direction. The reference vertical distance is the total number of dots in the dot matrix of the screen of the image display unit 12 in the vertical direction.

At step 140, two street names, which may be indicated in one screen, is determined as searched objects, since redundant indication of the name character strings of one street in one screen is annoying for a user.

At step 145, one of the street names of the selected pair is set to be non-indicative. Specifically, the indication/non-indication flag in a name record corresponding to the one of the street names of the selected pair is reset so as to prohibit indication of a character string of the street name on the map.

As shown in FIG. 5B, as a result of updated of the unit area 21 and non-update of the unit area 22, the same name character strings 27 and 27 of one street are indicated in one screen. By contrast, in the above method, the indication/non-indication flag in the name data corresponding to one of the street names, which correspond to the two name character strings 27 and 27, is reset. Thereby, redundant indication of the character strings of the same street name in one screen due to the area update operation can be avoided.

Figure 10:
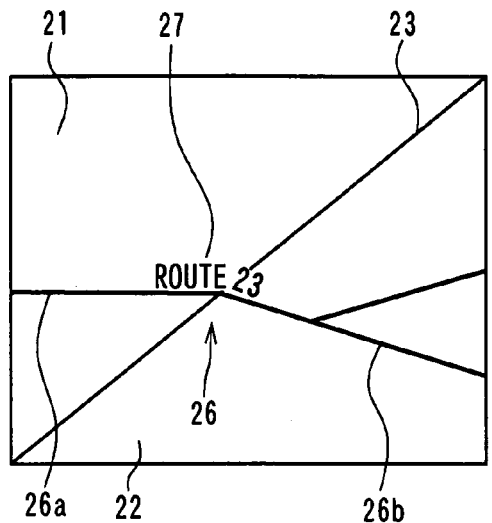
FIG. 10 is a view showing a condition where redundant indication of the same street names is avoided.

In this condition, as shown in FIG. 10, an indication position of the character string 27 of the street name, which is not set to be non-indicative, may be moved to the boundary 23 between the unit area 21, which is not updated, and the unit area 22, which is updated. Specifically, the reference position coordinates in the name record corresponding to the name character string 27, which is not set to be the non-indicative, are moved to the position of the boundary 23 between the non-updated unit area 21 and the updated unit area 22.

Subsequent to step 145, at step 140, it is again determined whether a pair of the same street names, which may be indicated in one screen, exists. In this way, one of a pair of the same street names, which may be indicated in one screen, is set to be non-indicative until all pairs of the same street names, which may be indicated in one screen, is eliminated. Therefore; all the pairs of the same street names, which may be indicated in one screen is eventually eliminated. When all the pairs are eliminated, step 140 makes a negative determination, and the processing proceeds to step 150.

At step 150, a certain name is searched from names, which are set to be non-indicative, in the vicinity of a boundary between two adjacent unit areas different in the version. The certain name is not overlapped with another name when indicated, and the same name as the certain name is not indicated in the vicinity of the certain name. When at least one of such a name exists, the processing proceeds to step 155.

Figure 11A:
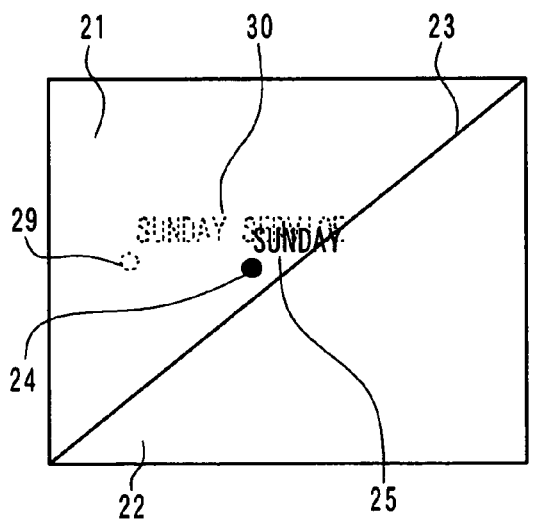
FIGS. 11A, 11B are views each showing one example of a name character string 30 set to be non-indicative, a name character string 30 being not overlapped another name character string when indicated and being not close to a name character string of the same name.
Figure 11B:
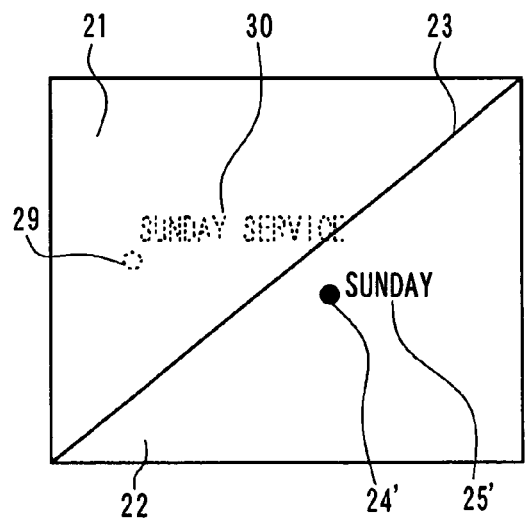

FIGS. 11A, 11B show an example of a name character string, which satisfies such a condition. FIG. 11A shows a condition before map data of the unit area 22 is updated by the area update operation. In this condition, the name character string 30 corresponding to the feature 29 overlaps the name character string 24 according to the name record corresponding to the feature 29. Therefore, the indication/non-indication flag of the name record corresponding to the feature 29 is beforehand reset at the time of map data creation.

Figure 8:
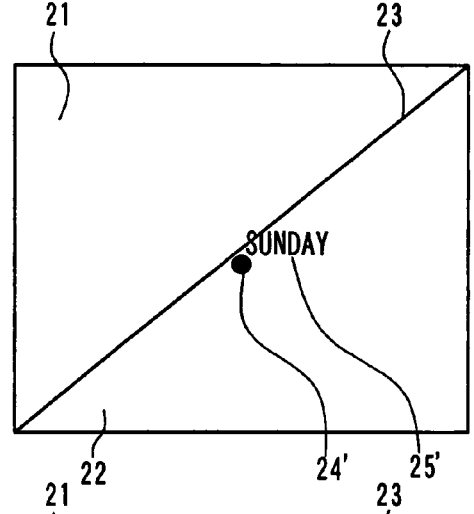
FIG. 8 is a view showing a condition where overlap of the same characters is avoided.

As shown in FIG. 11B, as described with reference to FIGS. 4A, 4B, 8, since the name character string 25' is added as a result of the area update operation, at step 125, the name character string 25 is set to be non-indicative. Consequently, the name character string overlapped the name character string 30 is eliminated; and the same name character string as the name character string 30 does not exist in the vicinity of the name character string 30.

It is determined whether a non-indicative character string of a certain name, which is overlapped a character string of another name, when the non-indicative character string is indicated by, similarly to step 110, comparing the reference position coordinates, the arrangement type, and the name-character number of the name record of the non-indicative name with those of another name record of an indicative name.

It is determined whether a non-indicative character string of a certain name is close to a character string of another name when the non-indicative character string is indicated by, similarly to step 130, comparing the reference position coordinates and the name-character number of the name record of the non-indicative name with those of another name record of an indicative name.

At step 155, a non-indicative name found at step 150 with the highest priority is changed to be indicative. That is, the indication/non-indication flag of the name record corresponding to the name is switched from reset to set.

It is determined which one of two names is higher in the priority based on the name indication class of the name record corresponding to the name. When the values of the name indication class of two of the name records are the same, the priority is determined based on a detailed priority of the name records.

Figure 12:
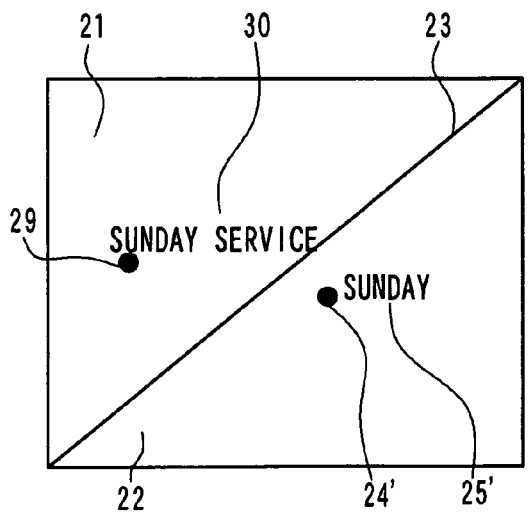
FIG. 12 is a view showing a condition where the name character string 30 is set to be indicative.

In the example of FIG. 11, FIG. 11B the name record corresponding to the name character string 30 of the feature 29 is specified, and the indication/non-indication flag in the specified name record is switched from reset to a set, as shown in FIG. 12. Thus, the non-indicative name character string 30 is changed to be indicative.

Subsequent to step 155, at step 150, another certain name is again searched from names, which are set to be non-indicative, in the search range. The certain name is not overlapped with another name when indicated, and the same name as the certain name is not indicated in the vicinity of the certain name. In this way, a name, which is set to be non-indicative, satisfies the condition, and has the highest priority, is switched to be indicative until names, which are set to be non-indicative and satisfy the condition, are eliminated. Therefore, all names, which are not overlapped with another name when indicated and are not in the vicinity of the same names are eventually switched to be indicative in the vicinity of area boundaries.

Previously, a character string of a name is manipulated so as not to overlap another name and manipulated so as not to be close to the same character string, as a result of setting the name to be non-indicative in order to avoid overlapped characters and the same characters close to each other. In the above method, all of such names can be switched to be indicative. That is, prohibition of indication, which is already meaningless, can be canceled.

In the embodiment, the control circuit 17 may function as one example of an extracting unit by executing steps 110, 115, 130, and 140 may function as one example of an prohibiting unit by executing steps 125, 135, and 145 and may function as one example of a prohibition canceling unit by executing steps 150 and 155.

Other Embodiment

As described above, although the embodiment has been described, the scope of the present invention is not limited to the embodiment. The scope of the present invention includes various forms, which can produce a function of each subject matter of the present invention.

For example, in the embodiment, the control circuit 17 performs the redundant characters avoidance operation immediately after the area update operation. It is noted that execution of the redundant characters avoidance operation need not be immediately after the area update operation, as long as the redundant characters avoidance operation is executed later than the area update operation. For example, the control circuit 17 may perform the redundant characters avoidance operation in parallel with the map indicating operation after the area update operation. In this case, an object of a redundant characters avoidance operation may be in a range of the indicated map.

According to the embodiment, at steps 125 and 135 of the program 100, from the pair of the same names having the character strings, which are overlapped one another, or from the pair of the same names having the character strings, which are close to each other, the name belonging to the unit area newer in the version is left as the indicated object name. Alternatively, the name belonging to the unit area older in the version may be left as the indicated object name According to the embodiment, at steps 120, 125, 135, and 145 of the program 100, the indication/non-indication flag of the name record corresponding to the name is reset to prohibit indication of the character string of the name on the map. It is noted that the method to prohibit indication of the character string of the name on the map may be performed by employing other various methods. Specifically, the name character string in the name record may be changed to a null character sequence (character string of a zero character): Alternatively, the name record itself may be deleted. Alternatively, indication of the character string may be prohibited in the map indicating operation.

In the embodiment, each function produced by execution of a program by the control circuit 17 may be produced by another hardware such as an FPGA, which can program a circuit structure having the function.

According to the embodiment, the in-vehicle navigation device 1 is employed as one example of the map updating device. It is noted that the map updating device need not be a device mounted to a vehicle and need not be a navigation device. For example, a cellular phone device having map data and a map indication function may be employed as the map updating device. That is, the map display device may be produced by employing various devices configured to perform map indication based on map data.

In the embodiment, the one screen may include multiple screen portions, which are indicated by using multiple display device to constitute one screen.

Summarizing the above embodiments, in order to attain the first object, a map display device includes an image display unit (12); a storage medium (16) configured to store map data divided into unit areas; and a control circuit (17) configured to indicate a map on the image display unit (12) according to the map data.

In the map display device, the map data includes name records, which respectively correspond to names to be indicated in the map, each of the name records includes information specifying a character string of a corresponding name and information specifying an indication range of the character string in the map.

the control circuit (17) includes an updating unit configured to update a part of the unit areas; an extracting unit (110, 115) configured to extract a pair of same character strings overlapped and indicated in the map with reference to the name records after update by the updating unit; and a prohibiting unit (125) configured to prohibit indication of one of the pair, which is extracted by the extracting unit (110, 115), in the map.

In this way, the map display device prohibits indication of one of the pair to avoid overlap of the pair of the same character strings after the update of the part of the unit areas. Thus, indication of the character strings of the same names overlapped one another due to the update of the part of the unit areas can be beforehand avoided.

In order to attain the first object, a map display device includes an image display unit (12); a storage medium (16) configured to store map data divided into unit areas; and a control circuit (17) configured to indicate a map on the image display unit (12) according to the map data.

In the map display device, the map data includes name records, which respectively correspond to names to be indicated in the map, each of the name records includes information specifying a character string of a corresponding name and information specifying an indication range of the character string in the map.

The control unit (17) includes an updating unit configured to update a part of the unit areas; an extracting unit (130) configured to extract a pair of same character strings closely indicated in the map with reference to the of name records after update by the updating unit, and a prohibiting unit (135) configured to prohibit indication of one of the pair, which is extracted by the extracting unit (130, 115), in the map.

In this way, the map display device prohibits indication of one of the pair to avoid close indication of the pair of the same character strings after the update of the part of the unit areas. Thus, indication of the character strings of the same names closely to each other due to the update of the part of the unit areas can be beforehand avoided.

Further, the control circuit (17) may include a prohibition canceling unit configured to:

i) after the prohibiting unit prohibits indication of one of the pair, which was extracted by the extracting unit, search a certain character string from a character string corresponding to a name record, which is prohibited from indication, in the plurality of name records, wherein the certain character string does not overlap a character string of an other name when indicated in the map, and the certain character string is not close to a character string of a same name when indicated in the map; and ii) cancel prohibition of indication of the found certain character string (150, 155).

Further, in the map data, each of the name records may include an indication/non-indication flag, which specifies whether a corresponding name is indicated. The prohibiting unit may be configured to reset the indication/non-indication flag of the name record corresponding to one character string of the pair, which was extracted by the extracting unit, so as to prohibit indication of the character string in the map.

In this case, the display device may include a prohibition canceling unit configured to:

i) after the prohibiting unit resets the indication/non-indication flag corresponding to the one of the pair, which was extracted by the extracting unit, search a certain character string from a character string corresponding to a name record, which has the indication/non-indication flag being reset, in the plurality of name records, wherein the certain character string does not overlap a character string of an other name when indicated in the map, and the certain character string is not close to a character string of a same name when indicated in the map; and ii) cancel prohibition of indication of the found certain character string (150, 155) by setting the indication/non-indication flag of the name record corresponding to the found character string.

Previously, in order to avoid overlap of the same characters or close indication of the same characters, a character string of a part of names is set to be non-indicative, and thereby a name character string became not to be overlapped and not to be closely indicated. In this way of the prohibition canceling unit, such a name character string can be indicated. That is, prohibition of indication, which is already meaningless, can be canceled.

In order to attain the second object, a map display device includes an image display unit (12); a storage medium (16) configured to store map data divided into unit areas; and a control circuit (17) configured to indicate a map on the image display unit (12) according to the map data.

In the map display device, the map data includes street name records, which respectively correspond to street names to be indicated in the map, each of the street name records includes information specifying a character string of a corresponding street name and information specifying an indication range of the character string in the map.

The control unit (17) includes an updating unit configured to update a part of the unit areas; an extracting unit (140) configured to extract a pair of character strings of same street names indicated in an indication range of the map within one screen of the image display unit (12) with reference to the street name records after update by the updating unit; and a prohibiting unit (145) configured to prohibit indication of one of the pair, which is extracted by the extracting unit (140), in the map.

In this way, the map display device prohibits indication of one of the pair to avoid indication of a pair of character strings of the same street name in one screen after the update of the part of the unit areas. Thus, redundant indication of the character strings of the same street name in one screen due to the update of the part of the unit areas can be beforehand avoided.

The control circuit (17) may include a prohibition canceling unit configured to:

i) after the prohibiting unit prohibits indication of one of the pair, which was extracted by the extracting unit, search a certain character string from a character string corresponding to a name record, which is prohibited from indication, in the name records, wherein the certain character string does not overlap a character string of an other name when indicated in the map, and the certain character string is not close to a character string of a same name when indicated in the map; and ii) cancel prohibition of indication of the found certain character string (150, 155).

The map data includes a plurality of name records, which respectively correspond to a plurality of names to be indicated in the map, each of the plurality of name records includes information specifying a character string of a corresponding name and information specifying an indication range of the character string in the map. A part of the name records may be the street name records. In the map data, each of the name records may include an indication/non-indication flag, which specifies whether a corresponding name is indicated.

In this case, the prohibiting unit may be configured to reset the indication/non-indication flag of the street name record corresponding to one character string of the pair, which was extracted by the extracting unit, so as to prohibit indication of the character string in the map.

Further, the display device may include a prohibition canceling unit configured to:

i) after the prohibiting unit resets the indication/non-indication flag corresponding to the one of the pair, which was extracted by the extracting unit, search a certain character string from a character string corresponding to a name record, which has the indication/non-indication flag being reset, in the plurality of name records, wherein the certain character string does not overlap a character string of an other name when indicated in the map, and the certain character string is not close to a character string of a same name when indicated in the map; and ii) cancel prohibition of indication of the found certain character string (150, 155) by setting the indication/non-indication flag of the name record corresponding to the found character string.

Previously, a character string of a part of street names is set to be non-indicative, and thereby a name character string became not to be overlapped and not to be closely indicated. In this way of the prohibition canceling unit, such a name character string can be indicated. That is, prohibition of indication, which is already meaningless, can be canceled.

The above processings such as calculations and determinations are not limited being executed by the control circuit 17. The control unit may have various structures including the control circuit 17 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A map display device comprising:
an image display unit;
a storage medium configured to store map data divided into multiple unit areas; and
a control circuit configured to indicate a map on the image display unit according to the map data,
wherein the map data includes multiple name records respectively corresponding to multiple names to be indicated in the map,
each of the multiple name records includes information specifying a character string of a corresponding name and information specifying an indication range of the character string in the map, and
the control circuit includes:
an updating unit configured to update a partial unit area in the multiple unit areas;
an extracting unit configured to extract a pair of same character strings, which are overlapped and to be indicated in the vicinity or a boundary between an area, which is in the map and is not updated by the updating unit, and the partial unit area, which is updated, with reference to the multiple name records, after update by the updating unit;
a prohibiting unit configured to prohibit indication of one of the pair, which is extracted by the extracting unit, in the map; and
a prohibition canceling unit configured to, after the prohibiting unit prohibits indication of one of the pair, which is extracted by the extracting unit:
search a character string, which does not overlap with a character string of an other name when indicated in the map and is not indicated close to a character string of a same name when indicated in the map, from a character string corresponding to a name record, which is prohibited from indication due to overlap with a character string before update by the updating unit, in the multiple name records; and
cancel prohibition of indication of the found character string.

2. A map display device comprising:
an image display unit;
a storage medium configured to store map data divided into multiple unit areas; and
a control circuit configured to indicate a map on the image display unit according to the map data,
wherein the map data includes multiple name records respectively corresponding to multiple names to be indicated in the map,
each of the multiple name records includes an indication/non-indication flag specifying whether to indicate corresponding name, information specifying a character string of a corresponding name, and information specifying an indication range of the character string in the map, and
the control circuit includes:
an updating unit configured to update a partial unit area in the multiple unit areas;
an extracting unit configured to extract a pair of same character strings, which are overlapped and to be indicated in the vicinity or a boundary between an area, which is in the map and is not updated by the updating unit, and the partial unit area, which is updated, with reference to the multiple name records, after update by the updating unit;
a prohibiting unit configured to prohibit indication in the map by resetting the indication/non-indication flag in the name record corresponding to the character string of one of the pair, which is extracted by the extracting unit; and
a prohibition canceling unit configured to, after the prohibiting unit resets the indication/non-indication flag corresponding to the one of the pair, which is extracted by the extracting unit:
search a character string, which does not overlap with a character string of an other name when indicated in the map and is not indicated close to a character string of a same name when indicated in the map, from a character string corresponding to a name record, which has the indication/non-indication flag being reset due to overlap with a character string before update by the updating unit, in the multiple name records; and
cancel prohibition of indication of the character string by setting the indication/ non-indication flag of the name record corresponding to the found character string.

3. A map display device comprising:
an image display unit;
a storage medium configured to store map data divided into multiple unit areas; and
a control circuit configured to indicate a map on the image display unit according to the map data,
wherein the map data includes multiple name records respectively corresponding to multiple names to be indicated in the map,
each of the multiple name records includes information specifying a character string of a corresponding name and information specifying an indication range of the character string in the map, and the control circuit includes:
an updating unit configured to update a partial unit area in the multiple unit areas;
an extracting unit configured to extract a pair of same character strings, which are to be closely indicated to a boundary between an area, which is in the map and is not updated by the updating unit, and the partial unit area, which is updated, with reference to the name records, after update by the updating unit;

a prohibiting unit configured to prohibit indication of one of the pair, which is extracted by the extracting unit, in the map; and a prohibition canceling unit configured to, after the prohibiting unit prohibits indication of one of the pair, which is extracted by the extracting unit:

search a character string, which does not overlap with a character string of an other name when indicated in the map and is not indicated close to a character string of a same name when indicated in the map, from a character string corresponding to a name record, which is prohibited from indication due to overlap with a character string before update by the updating unit, in the multiple name records; and cancel prohibition of indication of the found character string.

4. A map display device comprising:

an image display unit;

a storage medium configured to store map data divided into multiple unit areas; and a control circuit configured to indicate a map on the image display unit according to the map data, wherein the map data includes multiple name records respectively corresponding to multiple names to be indicated in the map, each of the multiple name records includes an indication/non-indication flag specifying whether to indicate a corresponding name, information specifying a character string of a corresponding name, and information specifying an indication range of the character string in the map, and the control circuit includes:

an updating unit configured to update a partial unit area in the multiple unit areas;

an extracting unit configured to extract a pair of same character strings, which are to be closely indicated to a boundary between an area, which in the map and is not updated by the updating unit, and the partial unit area, which is updated, with reference to the name records, after update by the updating unit;

a prohibiting unit configured to prohibit indication of the character string in the map by resetting the indication/non-indication flag in the name record corresponding to the character string of one of the pair, which is extracted by the extracting unit; and a prohibition canceling unit configured to, after the prohibiting unit resets the indication/non-indication flag corresponding to the one of the pair, which is extracted by the extracting unit:

search a character string, which does not overlap with a character string of an other name when indicated in the map and is not indicated close to a character string of a same name when indicated in the map, from a character string corresponding to a name record, which has the indication/non-indication flag being reset due to overlap with a character string before update by the updating unit, in the multiple name records; and cancel prohibition of indication of the character string by setting the indication/ non-indication flag of the name record corresponding to the found character string.

5. A map display device comprising:

an image display unit;

a storage medium configured to store map data divided into multiple unit areas; and a control circuit configured to indicate a map on the image display unit according to the map data, wherein the map data includes multiple street name records respectively corresponding to multiple street names to be indicated in the map, each of the multiple street name records includes information specifying a character string of a corresponding street name and information specifying an indication range of the character string in the map, and the control circuit includes:

an updating unit configured to update a partial unit area in the multiple unit areas;

an extracting unit configured to extract a pair of character strings of same street names, which are to be indicated close to a boundary between an area, which is in the map and is not updated by the updating unit, and the partial unit area, which is updated, in an indication range within one screen of the image display unit, with reference to the street name records after update of the updating unit;

a prohibiting unit configured to prohibit indication of one of the pair, which is extracted by the extracting unit, in the map; and a prohibition canceling unit configured to, after the prohibiting unit prohibits indication of one of the pair, which is extracted by the extracting unit:

search a character string, which does not overlap with a character string of an other name when indicated in the map and is not indicated close to a character string of a same name when indicated in the map, from a character string corresponding to a name record, which is prohibited from indication due to overlap with a character string before update by the updating unit, in the multiple name records; and cancel prohibition of indication of the found character string.

6. A map display device comprising:

an image display unit;

a storage medium configured to store map data divided into multiple unit areas; and a control circuit configured to indicate a map on the image display unit according to the map data, wherein the map data includes multiple name records respectively corresponding to multiple names to be indicated in the map, each of the multiple name records includes information specifying a character string of a corresponding name and information specifying an indication range of the character string in the map, a part of the multiple name records is multiple street name records respectively corresponding to multiple street names to be indicated in the map, each of the multiple street name records includes information specifying a character string of a corresponding street name and information specifying an indication range of the character string in the map, each of the multiple name records of the map data includes an indication/non-indication flag, which specifies whether to indicate a corresponding name, and the control circuit includes:

an updating unit configured to update a partial unit area in the multiple unit areas;

an extracting unit configured to extract a pair of character strings of same street names, which are to be indicated close to a boundary between an area, which is in the map and is not updated by the updating unit, and the partial unit area, which is updated, in an indication range within one screen of the image display unit, with reference to the multiple street name records after update of the updating unit;

a prohibiting unit configured to prohibit indication of the character string in the map by resetting the indication/non-indication flag in the street name record corresponding to the character string of one of the pair, which is extracted by the extracting unit; and a prohibition canceling unit configured to, after the prohibiting unit resets the indication/non-indication flag corresponding to the one of the pair, which is extracted by the extracting unit:

search a character string, which does not overlap with a character string of an other name when indicated in the map and is not indicated close to a character string of a same name when indicated in the map, from a character string corresponding to a name record, which has the indication/non-indication flag being reset due to overlap with a character string before update by the updating unit, in the multiple name records; and cancel prohibition of indication of the character string by setting the indication/non-indication flag of the name record corresponding to the found character string.

* * * * *